(12) United States Patent
Sasse et al.

(10) Patent No.: US 7,983,713 B2
(45) Date of Patent: Jul. 19, 2011

(54) SMART CARD; COMMUNICATION DEVICE; METHOD FOR SELECTING A COMMUNICATION NETWORK TO BE USED BY A COMMUNICATION DEVICE; COMPUTER PROGRAM PRODUCT

(75) Inventors: Joerg Sasse, Munich (DE); Roland Gruber, Unterhaching (DE)

(73) Assignee: Infineon Technologies AG (DE)

( * ) Notice: Subject to any disclaimer, the term of this patent is extended or adjusted under 35 U.S.C. 154(b) by 963 days.

(21) Appl. No.: 11/610,770

(22) Filed: Dec. 14, 2006

(65) Prior Publication Data

US 2008/0146280 A1 Jun. 19, 2008

(51) Int. Cl.
*H04M 1/00* (2006.01)
*H04W 4/00* (2009.01)

(52) U.S. Cl. .................. 455/556; 455/432.1; 455/432.3; 455/552.1

(58) Field of Classification Search .................. 455/558, 455/552.1, 432.1, 432.3, 435.1, 435.2, 550.1
See application file for complete search history.

(56) References Cited

U.S. PATENT DOCUMENTS

| 5,884,168 | A * | 3/1999 | Kolev et al. | 455/432.1 |
| 6,012,634 | A * | 1/2000 | Brogan et al. | 235/380 |
| 6,085,081 | A * | 7/2000 | Leskinen | 455/406 |
| 6,125,283 | A * | 9/2000 | Kolev et al. | 455/552.1 |
| 6,415,159 | B1 * | 7/2002 | Miyashita | 455/558 |
| 6,633,555 | B1 * | 10/2003 | Lin et al. | 370/331 |
| 6,714,799 | B1 * | 3/2004 | Park et al. | 455/558 |
| 6,961,587 | B1 * | 11/2005 | Vilppula et al. | 455/558 |
| 7,043,238 | B2 * | 5/2006 | Ahn et al. | 455/432.1 |
| 7,274,917 | B2 * | 9/2007 | Almgren | 455/161.1 |
| 7,356,337 | B2 * | 4/2008 | Florence | 455/432.2 |
| 7,363,032 | B2 * | 4/2008 | Phillips et al. | 455/422.1 |
| 7,366,510 | B2 * | 4/2008 | Gunaratnam et al. | 455/435.2 |
| 2009/0093269 | A1 * | 4/2009 | Lee | 455/552.1 |

FOREIGN PATENT DOCUMENTS

| DE | 199 48 950 A1 | 4/2001 |
| EP | 1 648 123 A1 | 4/2006 |
| WO | WO-02/21861 A2 | 3/2002 |
| WO | WO-2006/032460 A1 | 3/2006 |

OTHER PUBLICATIONS

3G TS 21.111 V3.0.0 (Apr. 1999); *Technical Specification*; 3rd Generation Partnership Project; Technical Specification Group Terminals USIM and IC Card Requirements (3G TS 21.111 version 3.0.0).

3G TS 22.011 V3.0.1 (Oct. 1999); *Technical Specification*; 3rd Generation Partnership Project; Technical Specification Group Services and System Aspects: Service accessibility (3G TS 22.011 version 3.0.1).

3GPP TS 23.122 V7.6.0 (Sep. 2006); *Technical Specification*; 3rd Generation Partnership Project; Technical Specification Group Core Network and Terminals; Non-Access-Stratum (NAS) functions related to Mobile Station (MS) in idle mode (Release 7).

(Continued)

*Primary Examiner* — Sonny Trinh
(74) *Attorney, Agent, or Firm* — Dickstein Shapiro LLP (57) ABSTRACT

Smart cards, a communication device, methods for selecting a communication network to be used by a communication device, and a computer program product.

12 Claims, 3 Drawing Sheets

OTHER PUBLICATIONS

TS 24.008 V3.1.0 (Oct. 1999); *Technical Specification*; 3rd Generation Partnership Project; Universal Mobile Telecommunications System; Mobile radio interface layer 3 specification, Core Network Protocols—Stage 3 (TS 24.008 version 3.1.0).

3GPP TS 31.102 V7.6.0 (Sep. 2006); *Technical Specification*; 3rd Generation Partnership Project; Technical Specification Group Core Network and Terminals; Characteristics of the Universal Subscriber Identity Module (USIM) application (Release 7).

* cited by examiner

FIG 1

SMART CARD; COMMUNICATION DEVICE; METHOD FOR SELECTING A COMMUNICATION NETWORK TO BE USED BY A COMMUNICATION DEVICE; COMPUTER PROGRAM PRODUCT

BACKGROUND

The present invention relates generally to smart cards, to a communication device, methods for selecting a communication network to be used by a communication device and a computer program product.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

In a radio communication system such as a mobile radio communication system, e.g. in a 3GPP (Third Generation Partnership Project) compliant communication system, a mobile communication device (also referred to as a mobile station in the following) usually performs a communication network selection upon certain events. The communication network to be selected may be a public land mobile communication network (PLMN), for example. It should be mentioned that, although the following described embodiments refer to a 3GPP compliant communication system (e.g. a UMTS communication system), any other kind of radio communication system, e.g. any other kind of mobile radio communication system may be used in an alternative embodiment of the invention. In one embodiment of the invention, the communication system is a wireless local area communication network (WLAN) interworking communication system. In another embodiment of the invention, the communication system is a GSM communication system (global system for mobile communications). In yet another embodiment of the invention, the communication system is a code division multiple access (CDMA) communication system or a CDMA 2000 communication system. In yet another embodiment of the invention, the communication system is a long-term evolution (LTE) communication system or a GSM/EDGE Radio Access communication network (GERAN) communication system.

As will be described in more detail below, in one embodiment of the invention, besides other rules, a selection priority of the PLMNs is given by two communication network priority lists, a first communication network priority list, also referred to as communication network operator controlled communication network priority list, and a second communication network priority list, also referred to as user controlled communication network priority list. The communication network priority lists are usually stored in a memory of a smart card of the communication device, in one embodiment of the invention, in the subscriber identity module (SIM) or UMTS subscriber identity module (USIM) of the respective user.

Usually, the PLMN selection process is implemented or resides in the protocol stack of the communication device outside the smart card.

This leads to the following problems:

a) The size of the communication network priority lists is continuously growing due to communication network operator requests. As the access to SIM data or USIM data is usually too slow, the SIM data or USIM data is usually mirrored to the random access memory (RAM) of the communication device such as the user mobile equipment. Especially for low end mobile communication devices such as low end mobile phones, RAM is a limited resource and thus the number of communication network priority list entries supported by an implementation is limited. If a communication network operator issues (U)SIMs with larger communication network priority lists, the communication device usually will only check a subset of the communication network priority list entries.

b) The possibilities for the communication network operator to control/influence the PLMN selection are limited, since, e.g in accordance with 3GPP, the process is conventionally standardized, and only the communication network operator controlled communication network priority list, which has a lower priority than the user controlled communication network priority preferred list, reflects the communication network operator preferences. Due to different roaming contracts (where the contracts could vary from month to month), communication network operators have dynamically changing preferences for the roaming communication networks.

Conventionally, the only possibility for the communication network operator to influence the PLMN selection is the "communication network operator controlled communication network priority list" stored on the SIM/USIM, more accurate, on the smart card of the communication device. The communication network operator controlled communication network priority list could be updated remotely via so called SIM-Toolkit functions. The support of the SIM-Toolkit features, however, is optional for the mobile communication devices in accordance with 3GPP.

A mobile communication device usually only supports a (implementation specific) number of PLMN entries in the communication network operator controlled communication network priority list. Thus, if a communication network operator issues a SIM/USIM with more entries, those will be ignored.

As will be described in more detail below, in accordance with one embodiment of the invention, the process for selecting the communication network, e.g. the communication network, which will be used by the communication device for further communication connections, e.g. the process for the ranking (prioritizing) of the communication networks to be used, e.g. of the PLMNs to be used, is located and thus implemented in the smart card, e.g. in the SIM or USIM of a user, the smart card being inserted in the communication device, as will be described in more detail below. The smart card may be addressed or accessed via a smart card interface, which may be standardized in a communication standard. In one embodiment of the invention, the entire or complete communication network selection process (e.g. including the final selection of the communication network to be used) is located and thus implemented in the smart card, e.g. in the SIM or USIM of a user, the smart card being inserted in the communication device, as will be described in more detail below.

Figure 1:
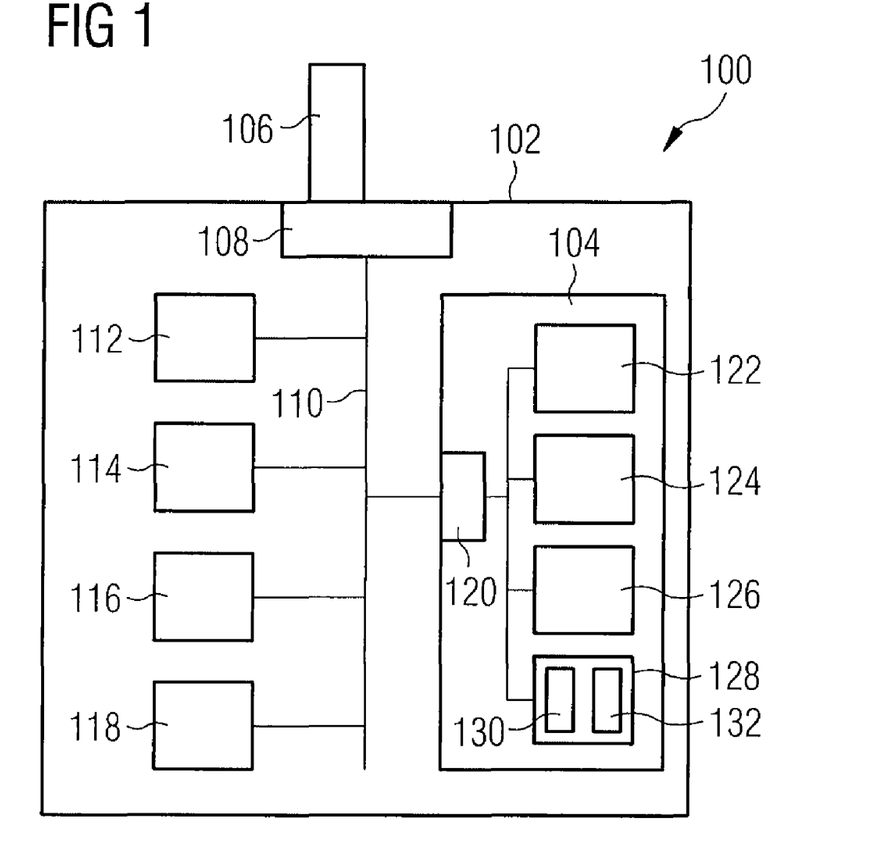
FIG. 1 shows a communication device in accordance with an embodiment of the invention.

Referring now to FIG. 1, a communication device 100 such as a mobile radio communication device, e.g. being configured in accordance with one of the above-mentioned communication standards, is shown. In one embodiment of the invention, the mobile radio communication device 100 may be implemented in a computing device such as e.g. a notebook computer, a personal digital assistant, and the like. In one embodiment of the invention, the mobile radio communication device 100 is a user equipment (UE) according to UMTS (Universal Mobile Telecommunications System). In one embodiment of the invention, the mobile radio communication device 100 includes a mobile radio phone 102 (e.g. a mobile equipment (ME) in accordance with 3GPP) and a smart card 104, e.g. a UICC (Universal Integrated Circuit Card). In another embodiment of the invention, the mobile radio communication device 100 may also be configured according to another radio communication standard like GSM or CDMA 2000 and the smart card 104 (also referred to as chip card) may be a corresponding smart card, for example a SIM (Subscriber Identity module) card in case of GSM or an R-UIM in case of CDMA 2000.

The ME 102 includes an antenna 106, a mobile equipment input/output interface 108 and the following components, which are connected to each other via a mobile radio phone bus connection 110: a transmitter/receiver 112, a programmable processor 114 (in an alternative embodiment of the invention, the programmable processor 114 may be replaced by a hard-wired logic), e.g. a microprocessor, at least one read only memory (ROM) 116 storing e.g. the computer program code that is executed by the programmable processor 114 for controlling the ME 102, and at least one random access memory (RAM) 118 storing e.g. data that is processed by the programmable processor 114. In an alternative embodiment of the invention, more or less components may be provided which are used for mobile radio communication. However, the other conventional components of the ME 102 will not be described in detail for clarity reasons.

As shown in FIG. 1, the smart card 104 is detachably inserted into the case of the ME 102 and includes a smart card input/output interface 120, the smart card input/output interface 120 being connected with the mobile radio phone bus connection 110 via corresponding electrical contacts, for example. The smart card 104 further includes a smart card transmitter/receiver 122 controlling the data exchange between the ME 102 and the smart card 104, a processing logic 124 such as a programmable processing logic such as e.g. a programmable microprocessor (in an alternative embodiment of the invention, the processing logic 124 may be hard-wired), a smart card read only memory (ROM) 126 storing e.g. the computer program(s) used for controlling the smart card 104. In other words, the smart card read only memory (ROM) 126 stores the computer program(s) providing the conventional smart card functionality, e.g. implementing the SIM or USIM functionality.

In one embodiment of the invention, at least a part of the communication network selection process which will be described in more detail below, is implemented as a computer program stored in the smart card ROM 126. It should be mentioned that in an alternative embodiment of the invention, the smart card ROM 126 may be replaced by a random access memory (RAM) such as e.g. a non-volatile RAM such as a Flash memory (e.g. a floating gate memory or a charge trapping memory). Furthermore, the smart card 104 includes a smart card random access memory (RAM) 128 (volatile or non-volatile). In one embodiment of the invention, data used during the operation of the smart card 104 are stored in the smart card RAM 128. In addition to the conventionally used data which will not be described in detail due to clarity reasons, the communication network operator controlled communication network priority list 130 and the user controlled communication network priority list 132 are stored in the smart card RAM 128. In alternative embodiments of the invention, the communication network operator controlled communication network priority list 130 and the user controlled communication network priority list 132 are provided or only one of the two priority lists 130, 132, i.e. only the communication network operator controlled communication network priority list 130 or only the user controlled communication network priority list 132, is provided.

In one embodiment of the invention, the communication between the ME 102 and the smart card 104 may be provided using a so called CAT command, a SAT (SIM application toolkit) command, a USAT (USIM application toolkit; USIM: UMTS subscriber identity module) command, or a CCAT (CDMA application toolkit) command.

In one embodiment of the invention, the USIM represents a logical functionality and is implemented on the smart card 104, which is e.g. configured as a UICC (Universal Integrated Circuit Card). The USIM (or SIM in an alternative embodiment of the invention), allows the usage of the ME 102 within a UMTS mobile communication network (or in a GSM communication network). By means of the USIM (or SIM), data are stored (e.g. in the smart card RAM 128 and/or in the smart card ROM 126) which serve for the identification of the user of the mobile radio communication device 100 when the mobile radio communication device 100 is used in a mobile communication system and which are used to verify the authorisation of the user to use a mobile communication service. Further, data are stored on the USIM which allow encryption and decryption of data sent and received by means of the mobile radio communication device 100.

Applications can be run on the smart card 104. These applications may be defined by the communication network operator of the mobile communication system that the mobile radio communication device 100 is used with. The applications can make use of the smart card input/output interface 120 between the ME 102 and the smart card 104, which in case of UMTS is provided by the so-called USAT (USIM application toolkit). By using the smart card input/output interface 120, the applications running on the smart card 104 can make use of functionalities of the ME 102, e.g. send text messages (like an SMS (Short Message Service) message), displaying a graphical icon on the display of the ME 102 or playing a tone using the loudspeaker of the ME 102. In an alternative embodiment of the invention, conventional SIM/USIM messages for communication between the ME 102 and the smart card 104 may be provided.

Figure 2:
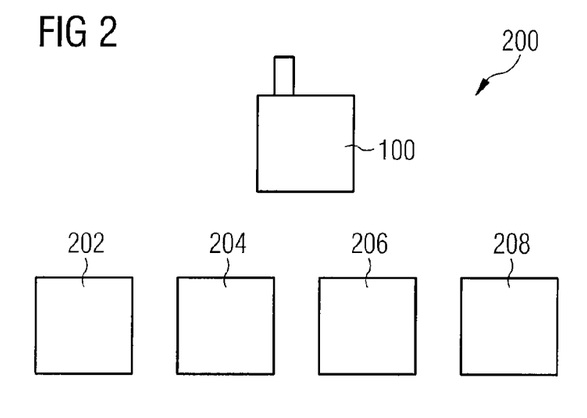
FIG. 2 shows a communication system in accordance with an embodiment of the invention.

Referring now to FIG. 2, a mobile radio communication system 200 is illustrated. The mobile radio communication system 200 includes an arbitrary number of communication devices such as the mobile radio communication device 100 and a plurality of communication networks 202, 204, 206, 208, which provide communication services for the communication devices. In one embodiment of the invention, some communication networks or all communication networks of the plurality of communication networks 202, 204, 206, and 208 are PLMNs.

In accordance with one embodiment of the invention, the communication device 100 selects one or a plurality of communication networks 202, 204, 206, and 208 for requesting communication services. The communication network selection may be provided e.g. for roaming purposes or in response to the occurrence of a predetermined event (which may be communicated to the smart card 104 from the ME 102 via the smart card input/output interface 120 or which may be generated by the smart card 104 itself, e.g. by using a smart card 104 internal timer (not shown), thereby starting the communication network selection process after a predetermined time represented by the timer setting), e.g. in case that a loss of mobile radio cell coverage occurs (i.e. the communication device 100 has lost the communication connection to the base station of the mobile radio communication network, for example).

The above described structure and configuration of the communication device 100 is the same for all embodiments described in the following, wherein the computer programs controlling the smart card is respectively configured in accordance with the respectively described functionalities and processes.

In one embodiment of the invention, the PLMN selection process is performed as an integrated functionality on the smart card 104 implementing the SIM/USIM.

In accordance with this embodiment of the invention, whenever a PLMN selection needs to be performed, the ME 102 determines a list of PLMNs, which are currently available for the communication device 100 (e.g. the list of PLMNs from which the communication device 100 has found mobile radio cells to communicate with).

The determined list of available PLMNs is transmitted to the smart card 104 (see message flow diagram 300 in FIG. 3) in a PLMN sorting request message 302 via the smart card input/output interface 120. Illustratively, the ME 102 requests the prioritization of the available PLMNs from the smart card 104 using the communication network selection processes, in this embodiment of the invention implemented as a PLMN ranking process, implemented in the smart card 104. The PLMN sorting request message 302 may further include some parameters to configure the special flavour of PLMN ranking that is requested. In one embodiment of the invention, the parameters may include radio signal quality information including information about the radio signal quality with regard to a respective available PLMN or other parameters which may be taken into consideration by the smart card 104 when ranking the PLMNs. In one embodiment of the invention, the parameters may include the information that the smart card is requested to regularly start a new communication network selection process on its own without an external trigger, e.g. after the expiration of a predetermined time period, which also may be included in the transmitted parameters.

Figure 3:
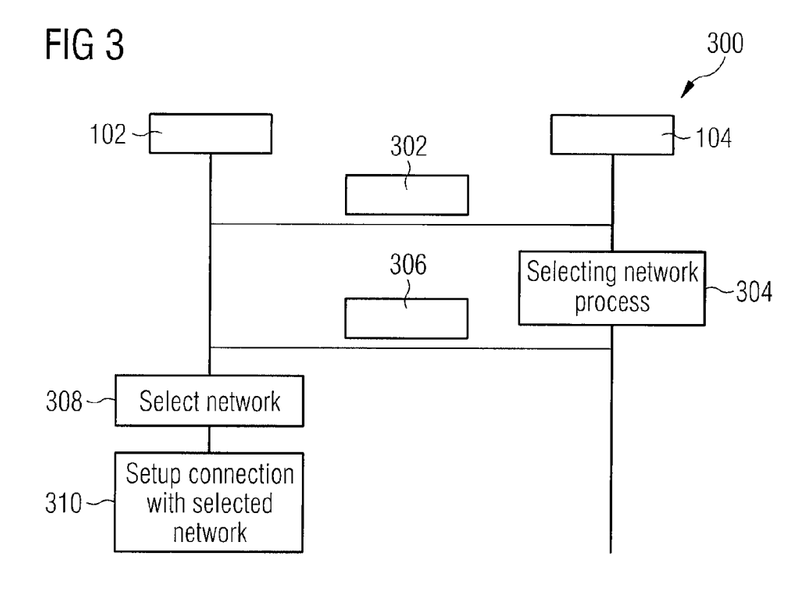
FIG. 3 shows a message flow diagram in accordance with an embodiment of the invention.

After the smart card 104 has received the PLMN sorting request message 302, it operates the smart card processing logic 124 selecting a communication network 304 to be used by a communication device using the smart card. In one particular embodiment of the invention, the smart card processing logic 124 carries out a communication network ranking process using the received available communication networks. The communication network ranking process may be implemented by using the preferences according to the priority lists 130, 132, for example, and comparing the received available communication networks with the communication networks included in the priority lists 130, 132. In one embodiment of the invention, the result of the communication network ranking process is a sorted list of those received available communication networks, which are contaniced in the priority lists 130, 132, wherein the received available communication networks are sorted in accordance with the preferences (priorities) indicated in the priority lists 130, 132.

In another embodiment of the invention, any other suitable and even more complex process for ranking the received available communication networks may be provided, e.g. taking into account further ranking criterions like the parameters mentioned above.

The determined sorted list is transmitted from the smart card 104 to the ME 102 in a PLMN sorting response message 306, again using a USAT command, for example. The PLMN sorting response message 306 is transmitted to the ME 102 via the smart card input/output interface 120. As described above, in an alternative embodiment of the invention, conventional SIM/USIM messages may be provided for communication between the ME 102 and the smart card 104.

After having received the PLMN sorting response message 306, the ME 102, more particularly, e.g. the processor 112 selects the communication network the communication device 100 will subsequently use, at 308. The selection may be provided fully automatic by the ME 102, in which case the processor 112 may select the PLMN in accordance with the sorted list. In one embodiment of the invention, the processor 112 may select the PLMN that is ranked at the top of the sorted list, i.e. the available PLMN having the highest priority in accordance with the sorted list. In one embodiment of the invention, illustratively, the SIM/USIM activates its internal PLMN ranking process and returns a sorted list of these available PLMNs back to the ME 102.

In accordance with another embodiment of the invention, the ME 102 selects the PLMN in a partially automized manner partly with the assistance of the user of the communiation device 100. In this embodiment, the ME 102 may display the sorted list to the user via the display of the communication device (not shown in the figures) for manual selection. The user may then manually select one PLMN out of the offered plurality of PLMNs as he desires.

After the selection of the communication network to be used, e.g. the PLMN to be used, has been completed, the communication device 100 then, at 310, sets up a communication connection to the selected communication network, e.g. the selected PLMN, e.g. to a base station of the selected communication network.

A description of the smart card input/output interface 120 for the above described embodiment in accordance with FIG. 3 will be provided in the following:

Interface ME 102 Towards SIM/USIM to Perform the PLMN Selection:

---

Rank_available_PLMNs_request( PLMN_list, PLMN_selection_type)
Parameters:
PLMN_list: { Number_of_PLMNs;
 PLMN_entry [PLMN_entry_1,....,
 PLMN_entry_n] };
PLMN_entry: { PLMN_code, Radio_Access_Technology,
 Signal_strength };
PLMN_selection_type: { normal, user re-selection, in-VPLMN };
Description:
Request to sort/rank the list of available PLMNs ("PLMN_list") according to the requirements for the indicated "PLMN_selection_type".

---

In other words, the ME 102 requests the sorted list using the parameters "PLMN_list", "PLMN_entry", and "PLMN_selection_type", wherein
 the parameter "PLMN_list" includes the subparameters "Number_of_PLMNs" (describing the number of currently available PLMNs) and "PLMN_entry", which is a list of the currently n available PLMNs [PLMN_entry_1, . . . , PLMN_entry_n], the parameter "PLMN_entry" includes the subparameters "PLMN_code" (being a unique identifier of the respective PLMN), "Radio_Access_Technology" (describing the radion access technology used in the respective PLMN), and "Signal_strength" (describing the signal strength of a signal sent by the respective PLMN and received by the communication device 100), and the parameter "PLMN_selection_type" includes the subparameters "normal" (denoting a normal selection type selecting the offered PLMN having the highest ranking), "user re-selection" (denoting a selection type according to which the user has the option to re-select the PLMN to be used), and "in-VPLMN" (denoting a selection type according to which the ME automatically (possibly event-driven, e.g. timer-driven) searches for a PLMN having a higher priority).

Interface SIM/USIM Towards ME 102 Providing the Resulting Sorted List:

---

Sorted_PLMN_list_indication( PLMN_list )
Parameters:
PLMN_list:    { Number_of_PLMNs;
              PLMN_entry [PLMN_entry_1,...., PLMN_entry_n] };
PLMN_entry:   { PLMN_code, Radio_Access_Technology };
Description:
Provision of the sorted/ranked list of PLMNs.

---

In other words, the smart card 104 provides a sorted list of PLMNs in the fornat as discussed above using the parameters "PLMN_list" and "PLMN_entry".

In the following, some effects of the smart card communication network ranking process will be described in more detail:

a) It could be ensured that all PLMNs for which the operator wants to define a preference are considered by the PLMN ranking process, since the PLMN ranking process resides in the SIM/USIM, in particular in the smart card 104.

b) The PLMN ranking process puts no constraints on the ME 102 in terms to ME RAM size, runtime, etc.

c) The PLMN ranking process is independent from the ME 102 (implementation); thus, the customer will always experience the same behaviour independent which ME 102 is used.

d) The operator has full control over the PLMN ranking process.

In accordance with another embodiment of the invention, the whole PLMN selection process is decriptively moved from the ME 102 towards the SIM/USIM, more accurately, to the smart card 104. For this purpose, a set of, e.g. standardized, interface functions between the ME 102 and the smart card 104 will be defined.

Figure 4:
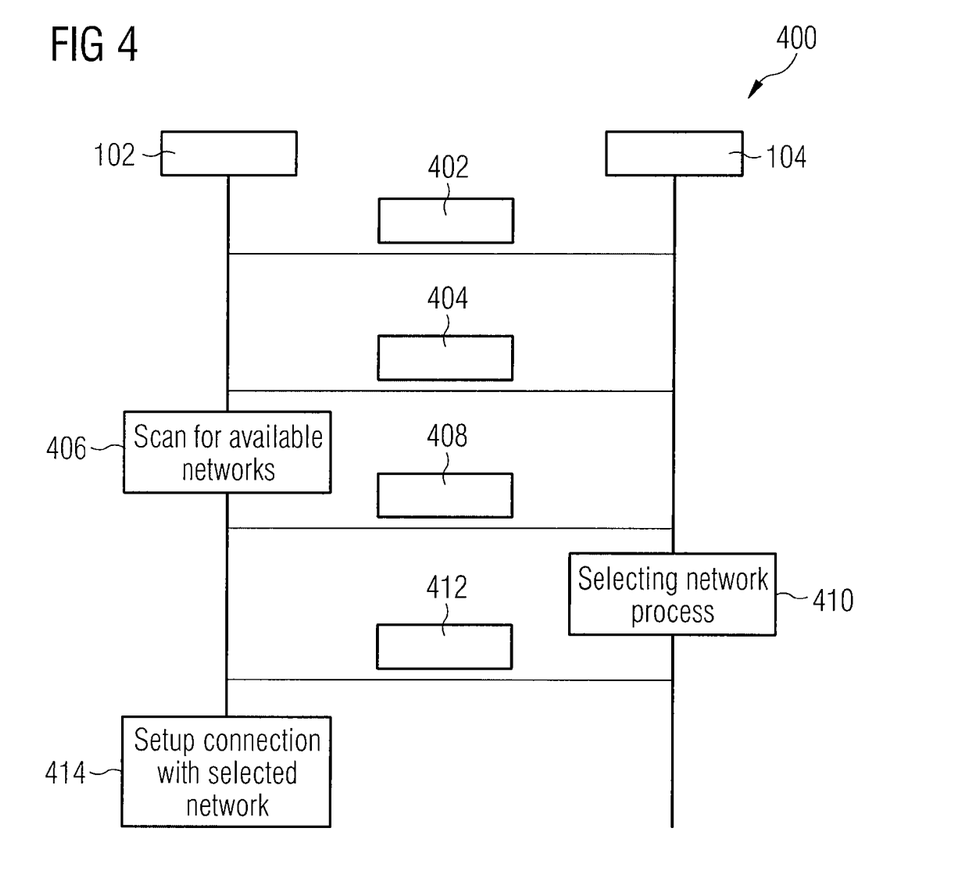
FIG. 4 shows a message flow diagram in accordance with another embodiment of the invention.

As shown in a message flow diagram 400 in FIG. 4, the ME 102 will indicate all possible events which could trigger a PLMN selection to the SIM/USIM in one or more trigger event messages 402. The one or more trigger event messages 402 is/are transmitted from the ME 102 to the smart card 104 via the smart card input/output interface 120. After having received the one or more trigger event messages 402, the smart card 104, e.g. the SIM/USIM is in charge to decide whether a PLMN selection shall be performed and in consequence which PLMN to select. For this propose, in accordance with one embodiment of the invention, the smart card 104 requests the ME 102 to perform a scan for all currently available PLMNs. This is implemented in that the smart card 104 generates a PLMN scan request message 404 and transmits the PLMN scan request message 404 to the ME 102.

After having received the PLMN scan request message 404, the ME 102 carries out a scan for available PLMNs (e.g. determines mobile radio cells to communicate with), thereby determining a list of currently available PLMNs.

The determined list of available PLMNs is transmitted to the smart card 104 in a PLMN scan response message 408 via the smart card input/output interface 120.

After the smart card 104 has received the PLMN scan response message 408, it operates the smart card processing logic 124 selecting a communication network 410 to be used by a communication device using the smart card 104. In one particular embodiment of the invention, the smart card processing logic 124 carries out a fully automized communication network selection process 410 by comparing the available PLMNs received in the PLMN scan response message 408 with the priority lists 130, 132, stored in the smart card RAM 128. In one embodiment of the invention, in accordance with the communication network selection process 410, the smart card processing logic 124 determines the available PLMN with the highest priority according to the priority lists 130, 132, for example.

After having determined the available PLMN with the highest priority, this PLMN is selected as the PLMN to be used by the communication device 100. The information about the selected PLMN (e.g. a unique identifier identifying the PLMN) is transmitted in a PLMN select message 412 to the ME 102 via the smart card input/output interface 120.

If a new PLMN is selected, the SIM/USIM will then request (also with the PLMN select message 412, alternatively, using a separate message being transmitted to the ME 102) the ME 102 to select the new PLMN.

After having received the PLMN select message 412 indicating the communication network to be used, e.g. the PLMN to be used, the communication device 100 then, at 414, sets up a communication connection to the selected communication network, e.g. the selected PLMN, e.g. to a base station of the selected communication network.

A description of the smart card input/output interface 120 for the above described embodiment in accordance with FIG. 4 will be provided in the following:

Interface ME 102 Towards SIM/USIM to Perform the PLMN Selection:

---

Set_PLMN_Selection_mode(automatic/manual)
Set_MS_type( MS_type)
    MS_type{ class_A, class_B, class_C_PS, class_C_CS }
Location_registration_result_indication( CN_domain,
current_RAI, LR_result_type, ePLMN_list )
    CN_domain
    current_RAI
    LR_result_type { LA_not_allowed,
Nat_roaming_not_allowed, ... max_LR_attempts,
illegal_ME, Authentication_reject; ....}
    ePLMN_list
    Service_status_indication( current_RAI, service_status,
available_PLMN_list)
    current_RAI
    service_status {Normal_service, No_service}
    available_PLMN_list
    Limited_service_indication( current_RAI, limited_service_cause)
    current_RAI
    limited_service_cause {#12, #13, ...}
    Get_initial_PLMN( )
    Available_PLMNs_indication( available_PLMN_list)

---

In other words, a mechanism is provided for selecting the PLMN selection mode using the function "Set_PLMN_mode" with two subparameters being offered for selection, namely an automatic PLMN selection mode (subparameter "automatic") or a manual PLMN selection mode (subparameter "manual").

Furthermore, the function "Set_MS_type" enables the setting of the type of ME 102 used for the communication device 100. The function "Set_MS_type" includes the parameter "MS_type" being a list of an arbitrary number of different selectable types of ME 102, e.g. a class_A device, a class_B device, a class_C_PS (packet switched) device, or a class_C_CS (circuit switched) device.

Moreover, the function "Location_registration_result_indication" is used for indicating the result of a registration process, with which the ME 102 tries to registrate with a respective PLMN. The function "Location_registration_result_indication" includes the following parameters:

---

- "CN_domain", which describes the domain type (e.g. circuit-switched or packet-switched) of the core communication network of the respective PLMN;
- "current_RAI" describing the current routing area identifier;
- "LR_result_type" describing the result of the location registration process; the parameter "LR_result_type" having the following subparameters:
  -- "LA_not_allowed" indicating that the Location Area (LA) has not been allowed;
  -- "Nat_roaming_not_allowed" indicating that a national roaming is not allowed;
  -- "max_LR_attempts" indicating a maximum number of allowed location registration attempts;
  -- "illegal_ME" indicating an illegal ME;
  -- "Authentication_reject" indicating a rejection of the authentication attempt;
- "ePLMN_list" including the so called Equivalent HPLMN (Home PLMN) list.

---

Using the function "Service_status_indication", the respective status of a current RAI is provided. The function "Service _status_indication" uses the following parameters:

---

- "current_RAI" indicating the current RAI;
- "service_status" indicating the service status of the current RAI; the parameter "service_status" includes the subparameters
  -- "Normal_service" indicating that the RAI is operating in a normal way;
  -- "No_service" indicating that the RAI is currently out of service;
- "available_PLMN_list" including the PLMNs that are currently available for the communication device 100.

---

The function "Limited_service_indication" is used to indicate that a respective RAI is currently only providing a limited service. The function "Limited_service_indication" uses the following parameters:

---

- "current_RAI" indicating the current RAI;
- "limited_service_cause" indicating the cause for the limitation of the available service, for example reasons "#12, #13, ...".

---

The function "Get_initial_PLMN" is used to request the smart card 104 to determine the initial PLMN.

The function "Available_PLMNs_indication" is used to provide the list of currently available PLMNs to the smart card 104. The function "Available_PLMNs_indication" includes the parameter "available_PLMN_list" including the names or identifiers of the respectively available PLMNs.

Interface SIM/USIM Towards ME 102:

---

Scan_for_available_PLMNs_request( )
Select_PLMN_request( PLMN_code, Radio_Access_Technology )

---

In other words, the interface SIM/USIM towards ME 102 provides two functions, a function "Scan_for_available_PLMNs_request" requesting the ME 102 to scan for available PLMNs, and a function "Select_PLMN_request" requesting the ME 102 to select a PLMN indicated in this function as a parameter. In detail, the function "Select_PLMN_request" has the following parameters:

---

- "PLMN_code" indicating the respective selected PLMN; and
- "Radio_Access_Technology" indicating the radio access technology that should be used when setting up a communication connection with the selected PLMN.

---

In the following, some effects of the communication network selection process described above will be described in more detail:

a) All effects listed for the smart card communication network ranking process described above.

b) The operator has full control, not only over the PLMN ranking, but also over the trigger criterions, i.e. when to perform a PLMN (re-)selection.

To be compatible with older SIM/USIMs or a respective smart card, not supporting the SIM/USIM based PLMN selection process according to the described embodiments, the ME 102 should support the conventional ME based PLMN selection process. If a SIM/USIM is not interested in the ME 102 or not activated (i.e. the PIN is not validated) the conventional ME 102 based PLMN selection process for this case will be executed.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
  a mobile radio phone comprising a communication device processing logic; and
  a smart card coupled to the communication device processing logic, the smart card comprising:
    a smart card processing logic configured to select at least one communication network to be used by a communication device using the smart card;
    a smart card memory configured to store information about at least one communication network to be selected; and
    a smart card interface providing the at least one selected communication network as communication network which can be selected to be used by the communication device,
    wherein the communication device processing logic is configured to select a communication network to be used of the at least one communication network provided by the smart card interface, and
    wherein the mobile radio phone is configured to set up a communication connection to the communication network selected by the communication device processing logic.

2. The communication device of claim 1, being a mobile radio communication device.

3. A method for selecting a communication network to be used by a communication device which comprises a mobile radio phone comprising a communication device processing logic, wherein the communication device further comprises a smart card coupled to the communication device processing logic, and wherein the smart card comprises a smart card processing logic and a smart card interface, the method comprising:
  selecting, by the smart card processing logic, at least one communication network to be used by the communication device;
  providing, by the smart card interface, the at least one selected communication network as communication network which can be selected to be used by the communication device from the smart card to the communication device processing logic;
  selecting, by the communication device processing logic, a communication network to be used of the at least one communication network provided by the smart card interface; and
  setting up, by the mobile radio phone, a communication connection to the communication network selected by the communication device processing logic.

4. The method of claim 3, wherein the smart card programmable processing logic comprises a smart card microprocessor.

5. The method of claim 3, wherein selecting the at least one communication network comprises selecting a mobile radio communication network to be used by the communication device.

6. The method of claim 3, wherein selecting the at least one communication network comprises selecting a public land mobile communication network to be used by the communication device.

7. The method of claim 6, wherein the selecting the at least one communication network is carried out using at least one communication network operator controlled priority communication network list stored in a smart card memory.

8. The method of claim 6, wherein the selecting the at least one communication network is carried out using at least one user controlled priority communication network list stored in a smart card memory.

9. The method of claim 3, wherein the selecting the at least one communication network is carried out using at least one priority communication network list stored in a smart card memory.

10. The method of claim 3, wherein the at least one communication network is selected after a predetermined time has elapsed.

11. The method of claim 3, wherein the selecting the at least one communication network is carried out using information about at least one communication network which is available for the communication device that is received via the smart card interface.

12. The method of claim 3, wherein the selecting the at least one communication network is carried out in response to a receipt of event information via the smart card interface.

* * * * *